United States Patent [19]

Zierler

[11] Patent Number: 4,644,844
[45] Date of Patent: Feb. 24, 1987

[54] MOVABLE CANNON

[75] Inventor: Reinhard Zierler, Linz, Austria

[73] Assignee: Voest-Alpine Aktiengesellschaft, Vienna, Austria

[21] Appl. No.: 495,605

[22] Filed: May 18, 1983

[30] Foreign Application Priority Data

May 21, 1982 [AT] Austria .................................. 2023/82

[51] Int. Cl.$^4$ ............................................. F41F 23/10
[52] U.S. Cl. .................... 89/40.08; 89/40.12; 89/40.15; 280/426; 280/442
[58] Field of Search ................... 89/40 F, 40 G, 40 H, 89/40 L, 40 R, 40 C, 40 N, 40 K; 280/419, 426, 442

[56] References Cited

U.S. PATENT DOCUMENTS

| 1,504,504 | 8/1924 | Randolph | 89/40.01 |
| 1,580,652 | 4/1926 | Dawson et al. | 89/40.15 |
| 3,910,353 | 10/1975 | Ralston | 280/426 |

FOREIGN PATENT DOCUMENTS 2947223  6/1981  Fed. Rep. of Germany ...... 280/419

Primary Examiner—Deborah L. Kyle
Assistant Examiner—John S. Maples
Attorney, Agent, or Firm—Cushman, Darby & Cushman

[57] ABSTRACT

For a cannon movable by means of a traction vehicle (9) and comprising an upper mount (18) and a lower mount (1) comprising the running wheels (16) and being designed as a swivelling bolster, two spars (2,3) are hingedly connected to the lower mount (1) and are interconnected at their ends remote from the lower mount (1) by a supporting rod (4) for forming a four-bar mechanism. One of said both spars (2,3) carries at its end remote from the lower mount (1) a limber rod (6) having its free end located approximately in the vertical longitudinal center plane of the four-bar mechanism and carrying the trailer coupling. For steering the lower mount (1) carrying the running wheels (16), a control mechanism capable of being put in operating connection with the traction vehicle (9) is provided. Said control mechanism can be formed of a strut rod (5) crossing, seen in a top plan view, the limber rod (6) and having one end hingedly connected to the spar (3) carrying the limber rod (6) and having its other end capable of being hingedly connected to the traction vehicle (9) at a lateral distance from the trailer coupling of the traction vehicle (9). For aligning the gun barrel (12) in an approximately parallel relation to the spars (2,3), a holding device for a gun barrel (12) is arranged on at least one of both spars (2,3).

5 Claims, 1 Drawing Figure

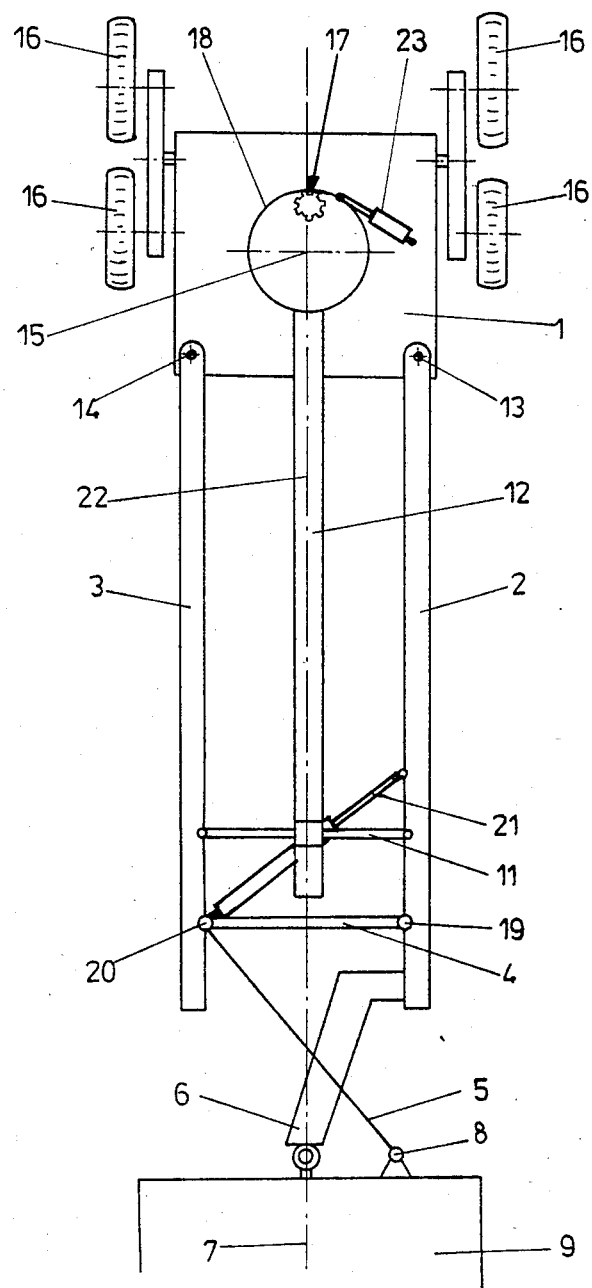

MOVABLE CANNON

The invention refers to a cannon movable by means of a traction vehicle and comprising an upper mount and a lower mount comprising the running wheels and being designed as a swivelling bolster. It is alrady known to rotate heavy cannons by means of an additional swivelling bolster support. Frequently, however, heavy cannons are directly coupled to a limber eye of the traction vehicle, said limber eye being in a direct connection with spars. With this type of coupling the cannon, there exists the drawback that when travelling along paths of short radius of curvature the cannon strongly deviates to a path of still shorter radius of curvature and try to short-cut the curve. This drawback has geometric reasons and is exclusively dependent on the distance of the traction vehicle from the wheel pair or the wheel pairs of the cannon.

The invention now aims at providing a cannon of the initially mentioned type which can be coupled to the traction vehicle such that the running wheels of the cannon or the lower mount, respectively, follow the track of the traction vehicle.

For solving this task, the invention essentially consists in that at least two spars are hingedly connected to the lower mount and are interconnected by means of a supporting rod connecting the spars to form a four-bar mechanism, in particular a parallelogram joint, in that a limber rod having its free end located approximately in the vertical longitudinal center plane of the four-bar mechanism and carrying the trailer coupling is rigidly connected to one of said both stars, in that a holding device for the gun barrel is arranged on at least one of said both spars and in that a control mechanism capable of being put in operating connection with the traction vehicle is provided for the control mechanism of the lower mount carrying the running wheels. In this manner all roads and terrains which can be travelled upon by the traction vehicle can be travelled upon with the cannon coupled to the traction vehicle. When travelling along curves, the spars are shifted one relative to the other in longitudinal direction and, in case of a parallelogram joint shifted one relative to the other in parallel relation and in mutually opposite directions. This parallel shift of the spars results in a swivelling movement of the lower mount so that the swivelling of the wheels of the cannon corresponds to the radius of curvature taken by the traction vehicle. For this relative movement of the spars, there is provided a control mechanism which can be put in operative connection with the traction vehicle and which can, in a particular simple manner, be formed of a strut rod crossing, seen from above, the limber rod and having one end hingedly connected to the spar opposing the spar carrying the limber rod and having its outer end adapted to be hingedly connected to the traction vehicle with a lateral distance from the trailer coupling of the traction vehicle. With such a construction it is only necessary to disengage the rotating mechanism of the gun barrel and to swivel same, respectively, so that the upper mount is free for movement relative to the lower mount and around the swivelling axis of the cannon, said swivelling axis simultaneously representing that axis around which the lower mount, and thus the running wheels, are rotated by the spars if the spars are hinged to the lower mount symmetrically to this swivelling axis.

The control mechanism for steering the lower mount carrying the running wheels can, according to a further development, be formed of a hydraulic cylinder-piston-aggregate connecting the spars and including in all operating positions with the longitudinal center axis of the four-bar mechanism an angle differing from 90°. In case of a hydraulic steering mechanism, the hydraulic cylinder-piston-aggregate connecting the spars and hingedly connected to the spars can be operated immediately by the pressure within the steering cylinders or by corresponding control cylinders being in connection with the wheels to be locked of the traction vehicle. As with the use of a strut rod engaging the traction vehicle in an off-center position, also in this case a certain steering position can be rigidly adjusted, and thus fixed in position by operating the hydraulic means.

According to a further development, the control mechanism can be designed as a cylinder-piston-aggregate connecting the upper mount with the lower mount and having, seen in a top-plan view, its joints located at a distance from the swivelling axis of the upper mount for rotating same relative to the lower mount, the gun barrel being locked relative to the spars by means of the holding device. In this case, adjustment of the lower mount is effected against the holding device provided as an abutment for the gun barrel and, thus, the gun barrel must be fixed in a corresponding stable position. Also this hydraulic cylinder-piston-aggregate can be controlled by the servo-steering mechanism of the traction vehicle. In a simple manner, the holding device for the gun barrel may comprise a rod hingedly connecting the spars and having its joints to the spars preferably arranged and adjacent those ends of the spars which are located at the side of the limber rod. This rod can optionally be formed of the supporting rod connecting the spars and connecting these spars to the lower mount for forming the four-bar mechanism, thus obtaining a particularly simple construction. For preventing the gun barrel from becoming damaged in the terrain the gun barrel is, via the holding device, yieldingly connected with at least one spar, noting that this yielding holding device shall admit shifting movement of the gun barrel in its longitudinal direction and within its holding device and shall admit swivelling movement of the gun barrel relative to the holding device.

In the following, the invention is further illustrated with reference to an embodiment shown in the drawing.

In the drawing, the lower mount is designated 1 and has hingedly connected thereto two spars 2 and 3. The spars 2 and 3 are hingedly connected one with the other by means of a supporting rod 4. One of said both spars 3 is hingedly connected to the traction vehicle in an off-center position by means of a strut rod 5. The upper of both spars 2 is, via a limber rod 6, rigidly connected to the trailer coupling. The hinge position of the strut rod is provided on the traction vehicle outside of the longitudinal center plane 7 of the traction vehicle and is designated 8. The traction vehicle itself is designated 9. The trailer coupling is located within the longitudinal center plane 7 of the traction vehicle.

Between both spars 2 and 3, a further connecting rod 11 is hingedly connected to those ends of the spars which are located nearest the limber rod, said connecting rod forming the support means for the holding device of the gun barrel 12. The hinge connection 13 of the spar 2 and 14 of the spar 3 is located on the lower mount 1 and at an equal radial distance from the swivelling axis 15 of the upper mount. A relative shifting movement of the spars 2 and 3 in their longitudinal direction thus results in a rotation of the lower mount around the axis 15 and thus also rotation of the wheels 16 about the axis 15 inasmuch as the wheels are carried by the lower mount. The upper mount is arranged for being rotated relative to the lower mount 1 by means of a gear mechanism 17 which must be disengaged during travelling movement for not obstructing the lower mount from being freely movable. The upper mount is schematically shown by the reference character 18.

A parallelogram joint is formed by the spars 2, 3, by the lower mount 1 and by the supporting rod hingedly connected to the spars 2 and 3 at 19 and 20, relative shifting movement of said both spars 2 and 3 being effected by the strut rod 5 being hingedly connected to the traction vehicle 9 in an off-center position.

In place of the strut rod 5, a cylinder-piston-aggregate 21 shown in dashed lines can be hingedly connected to said both spars 2 and 3. This cylinder-piston-aggregate 21 must coincide with the longitudinal center axis 22 of the cannon an angle which makes sure that pressure supply to the cylinder-piston-aggregate 21 does effect return movement of the wheels, and thus a straight-line position of the wheels. This cylinder-piston-aggregate 21 must thus include with the longitudinal center axis 22 an angle differing from 90° and this in all operating positions to comply with this geometric condition. The hydraulic cylinder-piston-aggregate 21 can be supplied with hydraulic fluid from the steering servo-mechanism of the traction vehicle or from a control cylinder connected with the steering mechanism of the traction vehicle.

As an alternative to the use of the strut rod 5 or of the hydraulic cylinder-piston-aggregate 21, there can be provided a hydraulic cylinder-piston-aggregate 23 collecting the upper mount 18 with the lower mount 1. The hinge position of this hydraulic cylinder-piston-aggregate 23 to the lower mount must as well as the hinge position of this hydraulic cylinder-piston-aggregate to the upper mount be located, seen in a top-plan view, outwardly of the swivelling axis 15, so that any shortening and elongation, respectively, of this hydraulic cylinder-piston-aggregate results in a rotation of the upper mount 18 relative to the lower mount 1. If the gun barrel 12 is now fixed to the connecting rod 11, operation of the hydraulic cylinder-piston-aggregate 23 results in a rotation of the lower mount 1 around the swivelling axis 15 as required for travelling along a curve. Also this hydraulic cylinder-piston-aggregate 23 can be actuated directly from the steering servo-mechanism of the traction vehicle or be connected with the steering mechanism of the traction vehicle via control cylinders. Also in this case the traversing gear 17 must be disengaged if steering of the running vehicle 16 shall not be obstructed by this traversing mechanism. Optionally, steering of the running wheel 16 can be effected by using the traversing gear with the gun barrel 12 in a fixed position.

What is claimed is:

1. Cannon movable by means of a traction vehicle and comprising an upper mount pivoted to a lower mount for rotation about a vertical axis, the lower mount carrying running wheels, the mounts thereby forming a swivelling bolster, characterized in that at least two laterally spaced apart spars are hingedly connected at one end to the lower mount for pivotal movement about vertical axes and are interconnected by means of a supporting rod pivoted at its ends to the spars for pivotal movement about vertical axes to form a parallelogram joint having a vertical longitudinal center plane, in that a limber rod having a free end located approximately in the vertical longitudinal center plane of the parallelogram joint and carrying a trailer coupling is rigidly connected to one of said spars at the end remote from said lower mount, in that a holding device for a gun barrel is arranged on at least one of said spars and in that a control mechanism for being put in operating connection with the traction vehicle is provided for controlling the maneuverability of the lower mount about the pivot axis of the upper mount when the cannon is being towed along a path of short radius.

2. Cannon according to claim 1, characterized in that the control mechanism includes a strut rod crossing the limber rod and having one end hingedly connected to that spar which opposes the spar carrying the limber rod and having its other end for hingedly connecting to a traction vehicle at a location lateral of a trailer coupling of the traction vehicle.

3. Cannon according to claim 1, characterized in that the control mechanism includes a hydraulic cylinder-piston-aggregate pivotally connecting at its ends with the spars and including in all operating positions an angle differing from 90° with respect to the longitudinal center axis plane of the parallelogram joint.

4. Cannon according to claim 1, characterized in that the control mechanism includes a cylinder and piston unit connecting the upper mount with the lower mount, the cylinder and piston unit having opposite ends pivoted to the upper and lower mounts at positions located at a distance from the swivelling axis of the upper mount for rotating same relative to the lower mount, the gun barrel being locked in position relative to the spars by means of the holding device.

5. Cannon according to claim 1, characterized in that the holding device for the gun barrel comprises a rod hingedly connecting the spars and having its joint positions to the spars arranged adjacent those ends of the spars which are located nearest the limber rod.

* * * * *